United States Patent [19]

Miller

[11] Patent Number: 4,491,602

[45] Date of Patent: Jan. 1, 1985

[54] APPARATUS AND PROCESS FOR COOKING FOOD

[75] Inventor: R. Craig Miller, Cerritos, Calif.

[73] Assignee: Pro/Pak Industries, Inc., Fullerton, Calif.

[21] Appl. No.: 542,757

[22] Filed: Oct. 17, 1983

[51] Int. Cl.³ .......................... A23L 1/01; A47J 37/12
[52] U.S. Cl. ..................................... 426/438; 99/404; 99/408; 426/417
[58] Field of Search ................. 99/408, 404; 426/438, 426/417

[56] References Cited

U.S. PATENT DOCUMENTS 2,652,767 9/1953 Childs .................................... 99/408

Primary Examiner—George Yeung
Attorney, Agent, or Firm—Willie Krawitz

[57] ABSTRACT

An apparatus and process is provided for cooking food which comprises advancing the food through a cooking oil bath in a tank. The oil is circulated by jet tubes through the tank at high speed to produce turbulence. This removes particles from heating surfaces in the tank and suspends them in the oil bath. The oil containing the suspension is removed from the tank, and the suspension is separated from the oil, usually be filtering. The filtered oil is then recycled to the tank.

The process reduces oil loss due to contamination caused by food particles burned or otherwise, and is particularly suited for cooking breaded or batter coated foods such as poultry, meat, fish, etc., and for cooking food that has particles adhering thereto, such as turkey, meat, potatoes, tortilla chips, and so forth.

12 Claims, 2 Drawing Figures

APPARATUS AND PROCESS FOR COOKING FOOD

BACKGROUND OF THE INVENTION

This invention relates to a new and improved process and apparatus for cooking food. More specifically, this invention concerns a process and apparatus for cooking food in an oil bath, the food having particles adhering thereto, such as breaded material, batter, strands of meat, etc. Typical foods that are suited for cooking according to this invention include poultry, such as breaded chicken and turkey, breaded shrimp and fish, meat in a batter or breaded form, potato chips, tortilla chips, and so forth. Also, food that has particles or food strands adhering thereto may be cooked with the process and apparatus of this invention.

Present processes and equipment for cooking breaded food such as poultry involves advancing the food through a slowly circulating cooking oil bath maintained in a cooking tank, and removing the cooked food product. During the cooking process, food particles such as batter, bread, meat, etc., are removed from the oil bath by mechanical systems when they sink to the bottom of the oil. However, not all of the particles are removed by these mechanical systems, and a certain number of them will contact the oil heating tubes in the tank and become somewhat burned or charred. Unless removed, these burned food particles will decompose the oil, clog up the system, and produce an unpleasant tasting product. Eventually, the cooking oil must be replaced. However, a shutdown of the cooking system to either clean the cooking tank or replenish the cooking oil is expensive from the standpoint of lost production time. Also, waiting customers will ultimately turn away. Closing down a food cooking production operation also poses problems insofar as food waiting to be cooked is concerned. This can become a health problem due to food spoilage or contamination if the food is left in the open and unrefrigerated.

Furthermore, if the oil must be replaced or replenished, this not only represents an expense, but the heat content of the oil is lost, and this becomes an additional expense.

A process and apparatus is desired that will increase cooking throughput rates, and at the same time reduce oil loss, heat content loss of the oil, and also reduce actual or potential food spoilage.

THE INVENTION

According to the invention, a process and apparatus is provided for cooking food in oil which comprises: cooking food in an oil bath, recirculating the oil in the apparatus at sufficient speed to remove the food particles from the apparatus, forming a suspension of the particles in the oil bath, removing the oil and suspended particles from the apparatus, separating the particles from the oil, and recycling the filtered oil to the cooking apparatus. In addition, the process of this invention is especially suited to remove food particles from the oil due to any source. Preferably, the particle separation is accomplished by an external filter. Typically, for say a 40-2,500 gallon tank capacity, the oil is recycled at a rate of about $\frac{1}{2}$-5 times/minute, based on the amount of oil in the tank. Usually, a recycling rate of once/minute is employed. Cooking temperatures vary from about 250°-450° F.

To achieve high recycling rates and produce good turbulence, the heated oil is fed to the cooking tank by a plurality of jet tubes inclined centrally and towards the tank length. The high speed turbulence removes the particles from the surfaces of the oil heating tubes and from the cooking tank. Hence, the particles can be readily filtered when the oil is recycled from the tank. Preferably, the recycling operation is carried out continuously.

DESCRIPTION OF THE PREFERRED EMBODIMENTS

Figure 1:
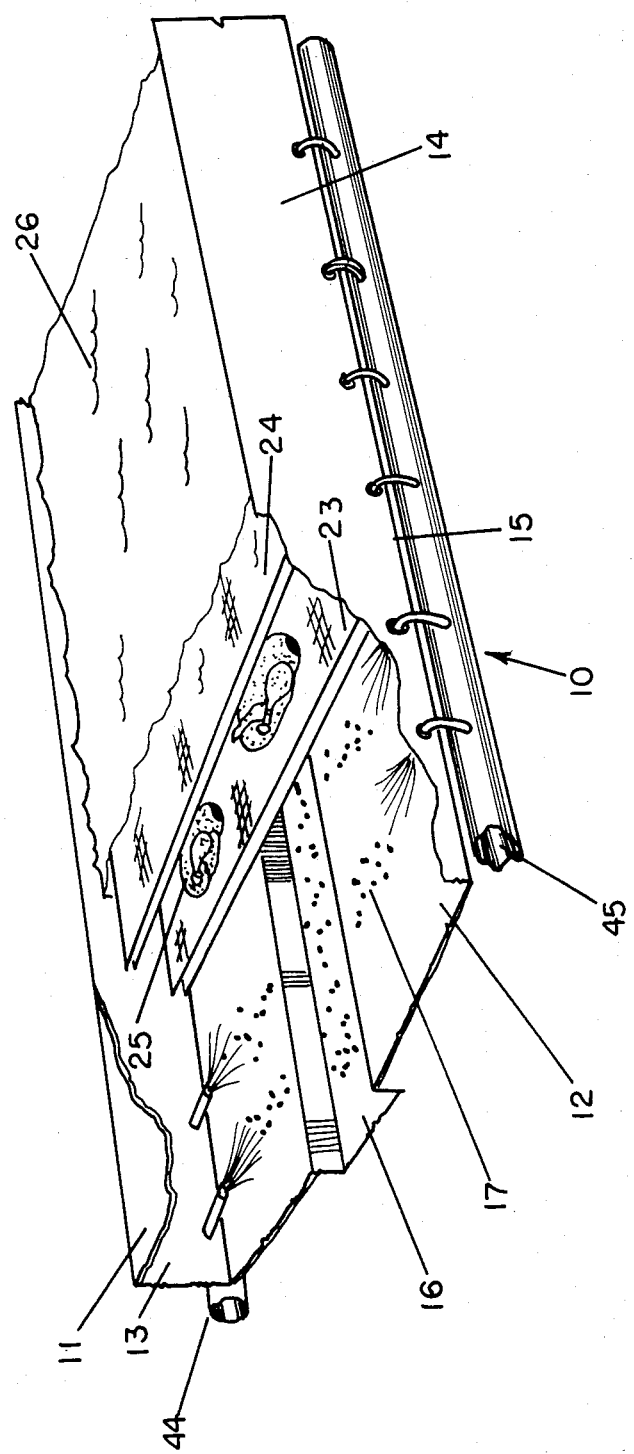
FIG. 1 is an external perspective view, partly broken away showing the food cooking apparatus of this invention; and, FIG. 2 is a bottom view of the apparatus of the invention showing the jet outlet and oil recycling and filter system.

The cooking apparatus 10 of this invention is shown in detail in FIG. 1, and comprises a top portion 11, bottom portion 12, and side walls 13, 14 that are welded together to form a tank 15. For food cooking purposes, a metal construction such as 304 stainless steel is preferred. The center area of the bottom portion 12 is recessed to form a longitudinal trough 16 which extends along the tank and functions to collect food debris 17 and particles for removal from the system. An effluent port 21 in the trough 16 drains debris ladened oil from the tank 15 into a filter tank 22. Endless conveyors 23, 24 of wire mesh, driven by a conventional means such as a chain drive, hydraulic system, etc., (not shown) move the food products 25, such as chickens through a cooking oil bath 26. The space between the conveyors is sized to secure the chickens between them at a suitable pressure.

A plurality of jet tubes 30 are positioned near the bottom of the tank, and function to direct a flow of oil at high speed toward the front and center of the tank 15, and along the trough to the effluent port 21. The action of the oil flowing through the jets produces turbulence in the cooking oil bath 26 and removes food particles and debris from the tank components. In addition, the jet flow directs the debris along the trough to the effluent port.

The jet orifices are produced by swaging down stainless steel tubes, and a typical orifice is oval-shaped with a size of about $\frac{1}{8}"\times\frac{3}{4}"$. The orifice spacings usually vary from say, 6"-9", to prevent lines of debris build-up along the tank bottom.

Figure 2:
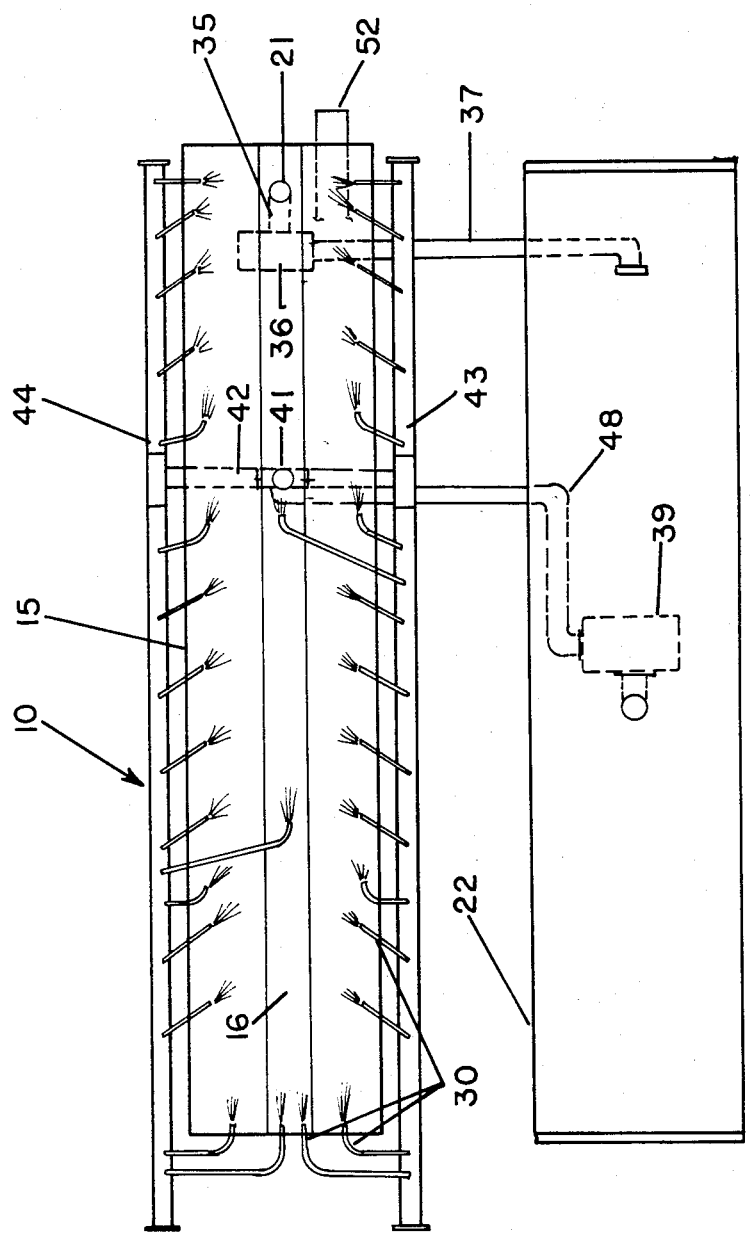

FIG. 2 shows the oil feed to the jets 30 and the effluent connection from the tank 15 to the filter tank 22. The effluent connection from port 21 in the trough 16 leads via a connector 35 to an effluent pump 36 and pipe connection 37 to the filter tank 22. Filtered oil from the filter tank 22 is recycled by a filter pump 39 through feed pipe 48 to an entry port 41 in a feed pipe 42. Jet feed pipes 43, 44 that feed the jets 30 are connected to feed pipe 42.

The oil in the system can be heated by gas, electricity, etc., applied to a plurality of heater tubes within the cooking tank, the filter tank, or external to the system. For example, a plurality of heater tubes, one such tube 52 being shown, and heated by gas, are located near the bottom portion 12 of the tank. This location improves heat transfer from the heater tubes 52 to the chickens due to upwardly moving convection currents in the oil bath, while still maintaining good cooking temperature control.

The rapid removal of food particles from the cooking oil, from the exterior of the heating tubes 52, and from the tank components significantly reduces decomposition of the oil. This in turn reduces downtime of the equipment and heat losses, and permits lengthy and predictable cooking runs.

It will be appreciated that equivalent processes are possible without departing from the spirit of the invention. For example, if few food particles are present, the oil recycling rate can be reduced considerably.

What is claimed is:

1. An apparatus for cooking food including batter or breaded coated food, which comprises:
   (a) an elongate container tank having sidewalls and a bottom portion for containing a bath of hot circulating cooking oil, a length at least greater than about 7 feet, and a tank capacity of at least about 40 gallons, the bottom portion of the tank defining a central channel along the elongate portion of the tank;
   (b) an effluent port in the central channel for removing the circulating oil and a suspension of cooking debris and food particles from the tank;
   (c) a plurality of jet tubes disposed at intervals along the central channel and along each sidewall for injecting a flow of cooking oil at a predetermined speed sufficient to produce turbulence in said cooking oil bath and to direct hot oil and said suspension from the sidewalls towards the central channel and along the central channel into the effluent port in a direction concurrently with movement of the food;
   (d) oil heating means;
   (e) endless conveyor means for continuously moving the food through the hot cooking oil bath;
   (f) filter means connected to the effluent port for separating the suspension from the hot cooking oil; and,
   (g) recycling means for returning the filtered hot oil from the filter means to the tank;
   whereby, the food particles and debris are removed by the circulating oil and filtering means at about ½–5 times/minute to minimize contamination of the oil.

2. The apparatus of claim 1, including oil heating means for heating the oil to about 250° F.–450° F.

3. The apparatus of claim 1, in which the endless conveyor comprises spaced apart wire mesh screens for securing the food therebetween.

4. The apparatus of claim 1, comprising an oil feed pipe connecting the filter means with the jet tubes.

5. The apparatus of claim 1, in which the tank capacity is in the range of about 40–2,500 gallons.

6. The apparatus of claim 5, in which the jet tubes provide orifice spacings varying from about 6″–9″.

7. A process for cooking food including batter or breaded coated food, comprising the following steps:
   (a) continuously moving the food by conveyor means through a bath of hot circulating cooking oil and cooking the food therein in an elongate container tank having sidewalls and a bottom portion for containing said bath of hot circulating oil, a length at least greater than about 7 feet, and a tank capacity of at least about 40 gallons, the bottom portion of the tank defining a central channel along the elongate portion of the tank.
   (b) injecting a flow of cooking oil into said cooking oil bath having a suspension of food debris and particles by means of a plurality of jet tubes disposed at intervals along the central channel and along each sidewall, said flow of oil being at a predetermined speed sufficient to produce turbulence in said cooking oil bath and to direct hot oil and said suspension of cooking debris and food particles from the sidewalls towards the central channel and along the central channel into an effluent port disposed in the central channel;
   (c) removing the oil and said suspension of cooking debris and food particles through the central channel and effluent port and into a filtering means;
   (d) filtering the suspension from the oil; and,
   (e) recycling the hot filtered oil to the container tank; whereby, the food particles and debris are removed by the circulating oil and filtering means at about ½–5 times/minute to minimize contamination of the oil.

8. The process of claim 7, in which the tank capacity is in the range of from about 40–2,500 gallons.

9. The process of claim 8, in which the oil is recycled at the rate of about once/minute, based on the amount in the tank, and the heating oil temperature is in the range of from about 250° F.–450° F.

10. The process of claim 9, in which the food is secured between spaced apart wire mesh screens of an endless conveyor.

11. The process of claim 10, in which the oil is recycled from the filter means to the jet tubes.

12. The process of claim 11, in which the jet tubes provide orifice spacings varying from about 6″–9″.

* * * * *